(12) United States Patent
Nainar et al.

(10) Patent No.: US 11,438,371 B2
(45) Date of Patent: Sep. 6, 2022

(54) DISTRIBUTED DENIAL OF SERVICE REMEDIATION AND PREVENTION

(71) Applicant: Cisco Technology, Inc., San Jose, CA (US)

(72) Inventors: Nagendra Kumar Nainar, Morrisville, NC (US); Carlos M. Pignataro, Cary, NC (US); Robert Edgar Barton, Richmond (CA); Jerome Henry, Pittsboro, NC (US); Muthurajah Sivabalan, Kanata (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 434 days.

(21) Appl. No.: 16/185,168

(22) Filed: Nov. 9, 2018

(65) Prior Publication Data
US 2020/0153856 A1    May 14, 2020

(51) Int. Cl.
*H04L 9/00*    (2006.01)
*H04L 9/40*    (2022.01)
*H04L 47/125*    (2022.01)

(52) U.S. Cl.
CPC ........ *H04L 63/1458* (2013.01); *H04L 47/125* (2013.01); *H04L 2463/141* (2013.01)

(58) Field of Classification Search
CPC ............... H04L 63/1458; H04L 47/125; H04L 2463/141
See application file for complete search history.

(56) References Cited

U.S. PATENT DOCUMENTS

| 7,409,712 B1 * | 8/2008 | Brooks ............... H04L 63/1458 713/188 |
| 8,307,442 B2 | 11/2012 | Asati et al. |
| 8,397,284 B2 | 3/2013 | Kommareddy et al. |
| 8,955,112 B2 | 2/2015 | Nguyen et al. |
| 9,450,978 B2 | 9/2016 | Vasseur et al. |
| 9,647,904 B2 | 5/2017 | Lissack |
| 9,647,929 B2 | 5/2017 | Alvarez et al. |
| 9,894,005 B2 | 2/2018 | Raindel et al. |

(Continued)

FOREIGN PATENT DOCUMENTS

JP    2017028547 A    2/2017

OTHER PUBLICATIONS

R. Barton, et al., "Traffic Redirection With Distributed Denial of Service Segment Identifiers", Technical Disclosure Commons, Defensive Publications Series, May 14, 2018, https://www.tdcommons.org/dpubs_series/1200, 5 pages.

(Continued)

*Primary Examiner* — Beemnet W Dada
(74) *Attorney, Agent, or Firm* — Edell, Shapiro & Finnan, LLC

(57) ABSTRACT

First data indicative of information that a packet is part of a DDoS attack is received at a management network device. A DDoS remediation network device to be used for remediation of packets associated with the DDoS attack is determined from the first data. Second data, indicative of the DDoS attack and indicative of the DDoS remediation network device, is transmitted from the management network device to an edge network device. The second data is configured to cause the edge network device to route packets associated with the DDoS attack to the DDoS remediation network device.

20 Claims, 7 Drawing Sheets

(56) References Cited

U.S. PATENT DOCUMENTS

| | | |
|---|---|---|
| 9,992,161 B2 | 6/2018 | Diaz et al. |
| 10,320,681 B2 | 6/2019 | Hira et al. |
| 10,341,748 B2 | 7/2019 | Anand et al. |
| 10,623,309 B1* | 4/2020 | Gampel .............. H04L 67/1002 |
| 2004/0148520 A1* | 7/2004 | Talpade .............. H04L 63/0227 726/22 |
| 2006/0031575 A1* | 2/2006 | Jayawardena .......... H04L 29/06 709/239 |
| 2011/0141899 A1 | 6/2011 | Yae |
| 2012/0005367 A1 | 1/2012 | Bettink et al. |
| 2014/0157405 A1 | 6/2014 | Joll et al. |
| 2014/0254385 A1 | 9/2014 | Tabatabaee et al. |
| 2014/0369356 A1 | 12/2014 | Bryant et al. |
| 2016/0261507 A1 | 9/2016 | Kwak et al. |
| 2017/0078187 A1 | 3/2017 | Zheng et al. |
| 2017/0289186 A1 | 10/2017 | Staniford |
| 2017/0366577 A1 | 12/2017 | Shapira et al. |
| 2017/0373966 A1 | 12/2017 | Liao et al. |
| 2018/0124090 A1* | 5/2018 | Koren .................... H04L 63/20 |
| 2018/0131617 A1 | 5/2018 | Hira |
| 2019/0297017 A1 | 9/2019 | Pignataro et al. |

OTHER PUBLICATIONS

J. Joseph Fowler, et al., "IMap: Visualizing Network Activity over Internet Maps", VizSec '14, Proceedings of the Eleventh Workshop on Visualization for Cyber Security, Nov. 10, 2014, Paris, France, 8 pages.

Daniel Dib, "Segment Routing: Potential for Far-Reaching Network Effects", https://www.networkcomputing.com/networking/segment-routing-potenti . . . , Jun. 9, 2015, 12 pages.

Vinícius Tavares Guimarães, "A Survey on Information Visualization for Network and Service Management", IEEE Communications Surveys& Tutorials, vol. 18, Issue: 1. Firstquarter 2016, http://hdl.handle.net/2078.1/171851, Jul. 24, 2015, 43 pages.

Barton, et al., "Traffic Redirection with Distributed Denial of Service Segment Identifiers," Technical Disclosure Commons, Defensive Publications Series, https://www.tdcommons.org/dpubs_series/1200, May 14, 2018, 5 pages.

Van De Velde, et al., "Flowspec Indirection-id Redirect," draft-vandevelde-idr-flowspec-path-redirect-03, IDR Working Group, Internet-Draft, https://datatracker.ietf.org/doc/html/draft-vandevelde-idr-flowspec-path-redirect, Jul. 8, 2016, 12 pages.

* cited by examiner

DISTRIBUTED DENIAL OF SERVICE REMEDIATION AND PREVENTION

TECHNICAL FIELD

The present disclosure relates to the remediation and prevention of Distributed Denial of Service attacks.

BACKGROUND

Distributed Denial of Service (DDoS) attacks are difficult to solve through traditional methods (e.g., Border Gateway Protocol (BGP) black holing, Access Control Lists (ACLs), rate limiters, etc.). These methods tend to filter out both legitimate traffic and the offending DDoS traffic at the same time. New high performance in-line traffic scrubbers have appeared on the market that attempt to better filter traffic by removing the offending traffic and forwarding the legitimate traffic. However, filters still present the limitation of redirecting all traffic intended for a potential DDoS victim to the scrubber.

DESCRIPTION OF EXAMPLE EMBODIMENTS

Overview

Briefly, mechanisms and network implementations are presented herein that provide for Distributed Denial of Service (DDoS) remediation and prevention. In one embodiment, first data indicative of information that a packet is part of a DDoS attack is received at a management network device. A DDoS remediation network device to be used for remediation of packets associated with the DDoS attack is determined from the first data. Second data, indicative of the DDoS attack and indicative of the DDoS remediation network device, is transmitted from the management network device to an edge network device. The second data is configured to cause the edge network device to route packets associated with the DDoS attack to the DDoS remediation network device.

EXAMPLE EMBODIMENTS

Figure 1:
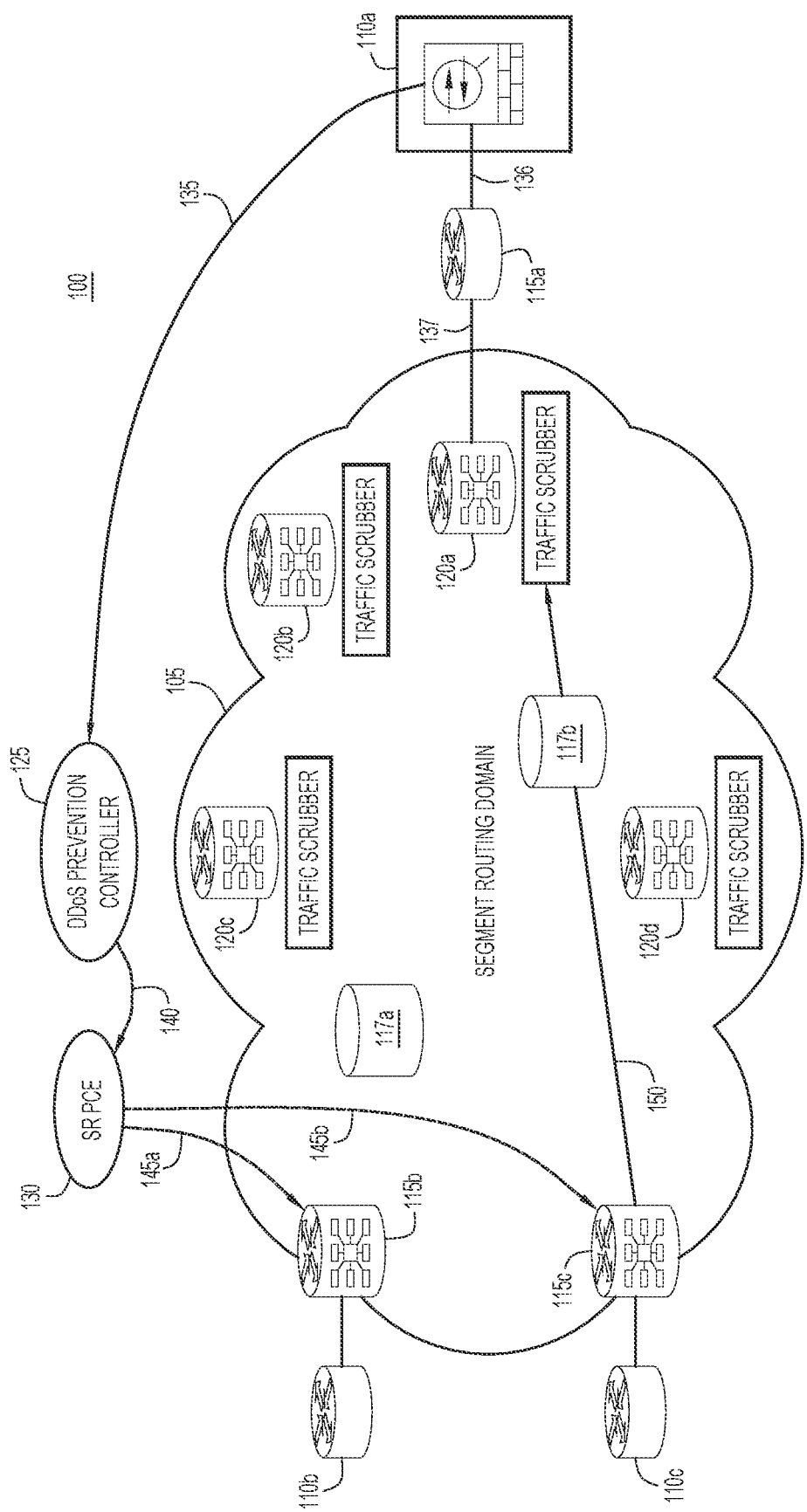
FIG. 1 is an illustration of a first network environment, and accompanying operations, configured to provide DDoS remediation and prevention, according to an example embodiment.

With reference now made to FIG. 1, depicted therein is a first network environment 100 configured to provide a first example embodiment of the DDoS prevention and remediation techniques of the present disclosure. Included in network environment 100 is network 105, which may be embodied as a segment routing domain. Segment routing is a technology that is a flexible, scalable way of implementing source routing. The source chooses a path and encodes data indicative of the path in the packet header as an ordered list of segments. Segments are identifiers for any type of instruction. Each segment is identified by a Segment Identifier (SID). Also included in network environment 100 are customer edge network devices (e.g., customer edge routers) 110a-c, provider edge network devices (e.g., provider edge routers) 115a-c, intermediate or transit network devices (e.g., transit routers) 117a and 117b, DDoS remediation network devices (e.g., traffic scrubbers) 120a-d, DDoS prevention controller network device 125 and Path Computation Element (PCE) network device 130. As used herein a "network device" is used to designate devices which implement the routing of network traffic through a network. For example, when traffic is sent from source device to a destination device, network devices are the devices that facilitate the transmission of the traffic between the source and destination devices. Additionally, while network devices 110a-c, 115a-c, 117a and 117b, 120a-d, 125 and 130 are illustrated as separate devices, a single network device may implement the functionality of multiple network devices. For example, PCE 130 may provide the functionality to be described below with reference to both DDoS prevention controller 125 and PCE 130. Similarly, the functionality to be described below with regard to traffic scrubbers 120a-d may take place at a network device that also provides other functionality, including but not limited to customer edge network devices 110a-c, provider edge network devices 115a-c, DDoS prevention controller 125 and/or PCE 130. Additionally, terms such as "transmit" and "receive" are broadly used herein to refer to techniques for providing and obtaining data in network environments. For example, data may be provided and obtained through packets transmitted and received through network 105 (or network 205 of FIGS. 2-5). Data may also be provided and obtained through data communicated via out-of-band signaling or control channels used in network environment 100 (or network environment 200 of FIGS. 2-5).

The techniques of the present disclosure begin when a DDoS attack is detected. As illustrated in FIG. 1, the DDoS attack is detected at customer edge network device 110a. Though, the detection of DDoS attacks may take place at other network devices. For example, DDoS attack detection may take place on-premise or otherwise, and may be in a firewall, a NetFlow analyzer, or another network device configured to identify packets that may be part of a DDoS attack. The DDoS attack detection techniques of the present disclosure may take place through known DDoS attack detection methods, such as Peak Flow DDoS attack detection. After detection, the attack is reported to DDoS prevention controller 125 via operation 135, and the packet is transmitted to traffic scrubber 120a via operations 136 and 137. As illustrated in FIG. 1, DDoS prevention controller 125 is embodied as a cloud-based centralized controller separate from PCE 130. Though, as noted above, the functionality of DDoS prevention controller 125 may be incorporated into another network device, such as PCE 130. DDoS prevention controller 125 communicates details of the attack to PCE 130 through operation 140. Operation 140 may be implemented through normal PCE communication models such as the PCE Protocol (PCEP). According to specific example embodiments, operations 135 and 140 may communicate information sufficient to identify the flow associated with the DDoS attack, such as the destination Internet Protocol address (destination IP) and the destination port associated with the packet that was determined to be part the DDoS attack.

PCE 130 then provides data indicative of information sufficient to identify the suspicious traffic to provider edge routers 115b and 115c, through operations 145a and 145b, respectively. This data may include one or more addresses (e.g., source IP address, destination IP address) and/or ports (e.g., source port, destination port, etc.) that may be used to identify suspected traffic. Operations 145a and 145b may also instruct provider edge routers 115b and 115c to impose a DDoS SID on packets that match the identifier provided in operations 145a and 145b. Upon receipt of a packet identified according to the data provided in operations 145b and 145c, provider edge routers 115b and 115c embed the DDoS SID in the packet header as part of the overall SID label stack. As the packet passes through network 105, the packets are observed by transit routers 117a and 117b as being "DDoS suspicious" packets. As described below, the inclusion of the DDoS SID in the packet header causes the packets to be sent to a traffic scrubber 120a-d.

The DDoS SID is not a simple packet forwarding SID label. Instead, the DDoS SID represents a network function in which the function is DDoS scrubbing. In other words, when a transit router 117a or 117b encounters a packet with the DDoS SID, it knows that one of the segments of the packet's path through network 105 should take the packet to one of traffic scrubbers 120a-d. Accordingly, when transit router 117b receives a packet from provider edge router 115c in operation 150, transit router 117b performs a lookup in its binding SID table for instructions based on the DDoS SID. The binding SID table is a set of instructions for network function SIDs that is part of the transit process in a segment routing router. In this case, the table includes instructions indicating that transit router 117b should forward the "DDoS suspicious" traffic for further investigation and cleaning. This traffic may be forwarded to the closest scrubber, which is traffic scrubber 120a in the example embodiment of FIG. 1. According to other example embodiments, the DDoS SID will indicate a particular traffic scrubber 120a-d to which the "DDoS suspicious" traffic should be forwarded. For example, the "DDoS suspicious" traffic for one particular DDoS attack may all be forwarded to the same traffic scrubber, in this case, traffic scrubber 120a. The determination as to whether a "DDoS suspicious" packet should be sent to the nearest traffic scrubber or a predetermined traffic scrubber may be determined via the specific value of the DDoS SID. Additionally, operations 145a and 145b, the operations via which edge routers 115b and 115c obtain the identifier for the suspicious traffic from PCE 130, may dictate which DDoS SID should be included in the packet header: the DDoS SID indicating transmission to a nearest traffic scrubber, or the DDoS SID indicating transmission to a particular traffic scrubber.

Through the techniques described above, traffic streams associated with possible DDoS attacks are identified at the entry points of network 105 and then segment routing steers (via SR Traffic Engineering) only the offending flows to a nearby or optimized traffic scrubber 120a-d for deeper analysis. Here, the offending traffic will be removed and the non-suspicious traffic will be kept. There may be multiple scrubbers in different locations. Flagging traffic as suspicious with the DDoS SID at the entry points of the network enables redirecting that traffic to the closest scrubber, thus load balancing traffic across scrubbers (as DDoS traffic typically is sourced from multiple addresses, and therefore enters the network through multiple points). Redirection may also occur before the suspicious traffic reaches the attacked segment, thus limiting the attack surface.

The combination of PCE traffic engineering and SR binding SIDs on the provider edge network device or router may facilitate the DDoS SID function. At the entry point of network 105 it may not be possible to identify with absolute certainty whether a particular traffic flow is part of the DDoS attack, because the DDoS traffic may be mixed with clean traffic. However, using segment routing, a packet may initially be labeled as DDoS suspicious (meaning it requires further investigation through an in line traffic scrubber). This information may then be distributed, and associated instructions provided to the edge and transit routers throughout the network.

The techniques described above may use existing methods to identify suspicious DDoS traffic. However, these techniques may also involve one or more of the following novel operations: (1) inserting a DDoS SID, which identifies the flow as suspicious and enables redirecting the flow towards a scrubber; (2) using the DDoS SID to invoke network function virtualization capabilities in the router, where the traffic scrubber is the virtualized function; and (3) re-engineering the cleaned traffic once it emerges from the traffic scrubber (e.g., after the traffic passes through the traffic scrubber, the DDoS SID may be removed from the cleaned traffic and forwarded to the intended destination).

Furthermore, because the DDoS SID is inserted into the label stack of the packet, the location of the insertion may be optimally or selectively located within the label stack. For example, the DDoS SID may be indicated by PCE 130 for inclusion in the label stack at an optimal position (not necessarily the top or bottom of the stack). The purpose of this selective location of the DDoS SID is to redirect, or traffic engineer, the DDoS traffic to the desired destination (e.g., the traffic scrubber, which is a "network function"). An indication of the optimal location within the label stack for the DDoS SID may be included in the information provided or transmitted to provider edge routers 115b and 115c through operations 145a and 145b.

The DDoS SID may also be configured for other operations, not just transmission of the packet to a traffic scrubber. For example, the DDoS SID may indicate other or additional actions, including the dropping of the packet, the redirection of the packet, indicating a secondary path to the indicated destination should be taken, and others. Such uses of the DDoS SID provide improvements over related art techniques for processing packets suspected of being associated with DDoS attached. For example, Security Group Tags (SGTs), involve inserting one label into the header to identify a group which dictates that all packets within the group must be filtered. The DDoS SID of the present disclosure may also represent an improvement over techniques implemented through SGTs that may not apply a dynamically differentiated network function based on a given SID.

Additionally, when a packet arrives at a midpoint node (e.g., transit router 117a or 117b), the transit router observes the DDoS SID in the label stack and invokes the binding SID capability within the transit router. Instead of simply forwarding the packet to the next segment, the binding-SID permits identifying this packet as requiring a specialized network function (e.g., traffic scrubbers 120a-d). Accordingly, transit router 117a or 117b, upon receipt of the packet may perform a lookup in the binding SID table and forwards the packet to one of traffic scrubbers 120a-d. Furthermore, the DDoS SID imposed by PCE 130 allows the transit router to intelligently choose the optimal traffic scrubber and the path to arrive at the traffic scrubber. For example, as load increases, a given SID may redirect all suspicious traffic to a given scrubber or start directing to a second scrubber, reacting to the same label but an increase traffic load. SGTs are unable to apply such progressive (software-based) traffic engineering functions.

Accordingly, through the techniques described above, DDoS information is extended to PCE 130. PCE 130 uses a network function SID, referred to herein as a DDoS SID, imposed on the edge routers by PCE 130, to identify potentially suspicious DDoS traffic. The DDoS SID is used in edge or transit routers to direct suspicious traffic to nearby or specially optimized DDoS scrubbing engines (e.g., traffic scrubbers 120a-d) so that traffic may be cleaned. Other traffic flows proceed unchanged through the network.

Figure 2:
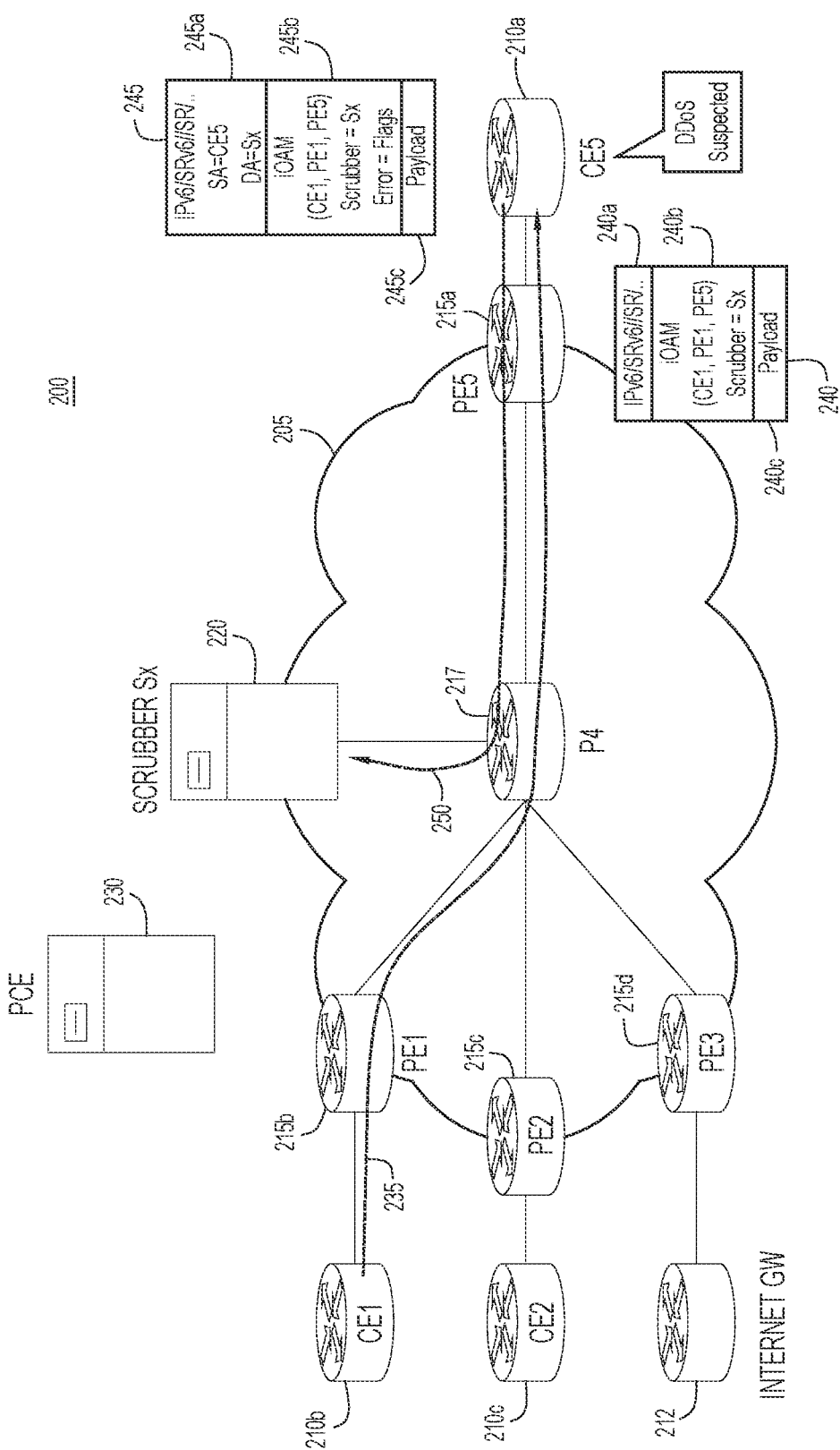
FIG. 2 is an illustration of a second network environment, and accompanying operations, configured to detect packets suspected of being associated with a DDoS attack, according to an example embodiment.

With reference now made to FIG. 2, depicted therein is a network environment 200 illustrating a second example embodiment of the DDoS prevention techniques of the present disclosure. Similar to environment 100 of FIG. 1, network environment 200 includes network 205, customer edge network devices 210a-c, provider edge network devices 215a-d, intermediate or transit network device 217, traffic scrubber 220 and a management network device, in this example embodiment, path computation element 230. In this example embodiment, traffic is transmitted from customer edge network device 210b to customer edge network device 210a through network 205 using a multipoint conduit 235, which provides a tunnel between customer edge network device 210b and customer edge network device 210a. Similar multipoint conduits may be used to transmit traffic between internet gateway 212 and customer edge network device 210a. Accordingly, the DDoS remediation and prevention techniques described below with reference to traffic received from customer edge network device 210b may also be applied to traffic received from internet gateway 212.

Multipoint conduit 235 may differ from a traditional conduit in that it may provide a tunnel between more than just two points. While conduit 235 may initially include only two end points (customer edge 210b and customer edge 210a), as will be described below, the techniques of the present disclosure may leverage multipoint conduit techniques to provide DDoS prevention and remediation. Because DDoS attacks are inherently distributed, and all potential ingress points to the network need to correctly send suspicious traffic to a nearby DDoS remediation network device, multipoint conduits provide a novel and advantageous technology for preventing DDoS attacks.

In a multipoint conduit, such as multipoint conduit 235, traffic flowing between customer edge network devices (e.g., customer edge network devices 205a-d) via provider edge network devices (e.g., provider edge network devices 215a-d), or between internet gateway 212 and a provider edge network device, will use a multipoint conduit header portion, an example of which is illustrated in packet 240. Packet 240 includes a first header portion 240a that identifies the type of header being used to implement the multipoint conduit (e.g., Internet Protocol version 6, Segment Routing version 6, Segment Routing, etc.), and includes the addresses of the source and destination of the packet, in this case, customer edge network device 210b and customer edge network device 210a, respectively. Also included in packet 240 is multipoint conduit header portion 240b. As illustrated in FIG. 2, multipoint conduit header portion 240b is embodied as an in-situ Operations, Administration and Management (iOAM) header. Multipoint conduit header portion 240b includes the elements of the conduit (customer edge router 210b, provider edge router 215b, provider edge router 215a), a DDoS remediation network device to be utilized by the conduit if necessary, in this case traffic scrubber 220, and flags indicating whether or not the packet requires scrubbing and why. These flags are not yet included in packet 240, as the packet has not yet been identified as being suspected as part of a DDoS attack.

As will be described in more detail below, the multipoint conduit is pushed by the customer edge network device if the next-hop is a provider edge network device, and the destination customer edge network device removes the header if it is received from a provider edge network device. In their basic form, the data carried in the multipoint conduit header portion 240b is initially limited such that only the customer edge network device and provider edge network device information are carried. The multipoint conduit header portion 240b may be augmented with additional details by the provider edge network devices and/or transit network devices. This augmented data includes the data indicating the DDoS remediation network device to be utilized and the flags indicating whether or not the packet requires scrubbing. Generally, intermediate or transit network devices, such as network device 217, will not be included in multipoint conduit header portion 240b. Accordingly, the multipoint conduit header portion 240b may carry limited (yet useful) path information (via iOAM) without leaking any internal data. Embodiments of the multipoint conduit header portion 240b implemented through an iOAM header may be preferred as they may be dynamically augmented with path information at the line rate of the network. According to other example embodiments, multipoint conduit header portion 240b may be embodied as container type-length-value (TLV) encoded data.

In the specific example of FIG. 2, customer edge network device 210b sends traffic to customer edge network device 210a using multipoint conduit 235. During the insertion of multipoint conduit header portion 240b into the traffic, customer edge network device 210b includes the iOAM information illustrated in FIG. 2, specifically, customer edge network device 210b as the source customer edge network device, customer edge network device 210a as the destination customer edge network device, and provider edge network device 215b as the provider edge network device local to the source customer edge network device. Upon receipt of the traffic, provider edge network device 215b includes information, such as the DDoS remediation network device to use if necessary, in this case, traffic scrubber 220. Upon receipt at the egress provider edge network device for network 205, in this case, provider edge network device 215a, provider edge network device 215a includes its identity in multipoint conduit header portion 240b. Accordingly, packet 240 illustrates the packet as it emerges from provider edged network device 215a. At this time, packet 240 includes the initial details provided by customer edge network device 210b, as well as the additional details provided by ingress provider edge network device 215b and egress provider edge network device 215a. Absent from packet 240 are any error flags, as it has not yet been determined that packet 240 is suspected of being part of a DDoS attack.

Upon receipt at customer edge network device 210a, the multipoint conduit header portion 240b is removed, and customer edge network device 210a (or another device downstream from customer edge network device 210a) determines that the packet is part of a DDoS attack. For example, customer edge network device 210a may be embodied as a firewall, and therefore, customer edge network device 210a makes this determination. According to other example embodiments, customer edge network device 210a receives this information from another device or system, such as a Deep Packet Inspection (DPI) engine arranged downstream from customer edge network device 210a.

In response to determining that packet 240 is suspected of being part of a DDoS attack, customer edge network device 210a will create a new multipoint conduit that will result in traffic associated with the DDoS attack being routed to traffic scrubber 220. The new multipoint conduit is implemented through the information contained in packet 245. Included in packet 245 is a first header portion 245a, which is analogous to first header portion 240a of packet 240. First header portion 245a identifies the type of header being used to implement the multipoint conduit (e.g., Internet Protocol version 6, Segment Routing version 6, Segment Routing, etc.), and includes the addresses of the source and destination of the packet, in this case, customer edge network device 210a and traffic scrubber 220, respectively. Also included in packet 245 is multipoint conduit header portion 245b, that is analogous to multipoint conduit header portion 240b of packet 240. Multipoint conduit header portion 245b includes the elements of the conduit (customer edge router 210b, provider edge router 215b, provider edge router 215a), the DDoS remediation network device to be utilized by the conduit if necessary, in this case traffic scrubber 220, and in addition to what was contained in packet 240, error flags indicating that the packet requires scrubbing and why. Included in the error flags may be relevant details that identify why packet 245 was determined as possibly being part of a DDoS attack. This information may include whether or not the packet was received from an unknown source, whether or not the packet was received with an abnormal connection rate, the packet's previous history, and other information that may be used to determine whether or not the packet could be part of a DDoS attack.

Also included in packet 245 is payload portion 245c, which is essentially the same as payload portion 240c of packet 240. First header portion 245a and multipoint conduit header portion 245b result in packet 245 being routed to traffic scrubber 220, as illustrated in operation 250. Through the creation of the new multipoint tunnel, implemented through first header portion 245a and multipoint conduit header portion 245b, packet 245 will be scrubbed by traffic scrubber 220. As described below with reference to FIGS. 3 and 4, the generation of packet 245 and its transmission to traffic scrubber 220 will also result in further DDoS remediation of additional packets through the use of a multipoint conduit.

Figure 3:
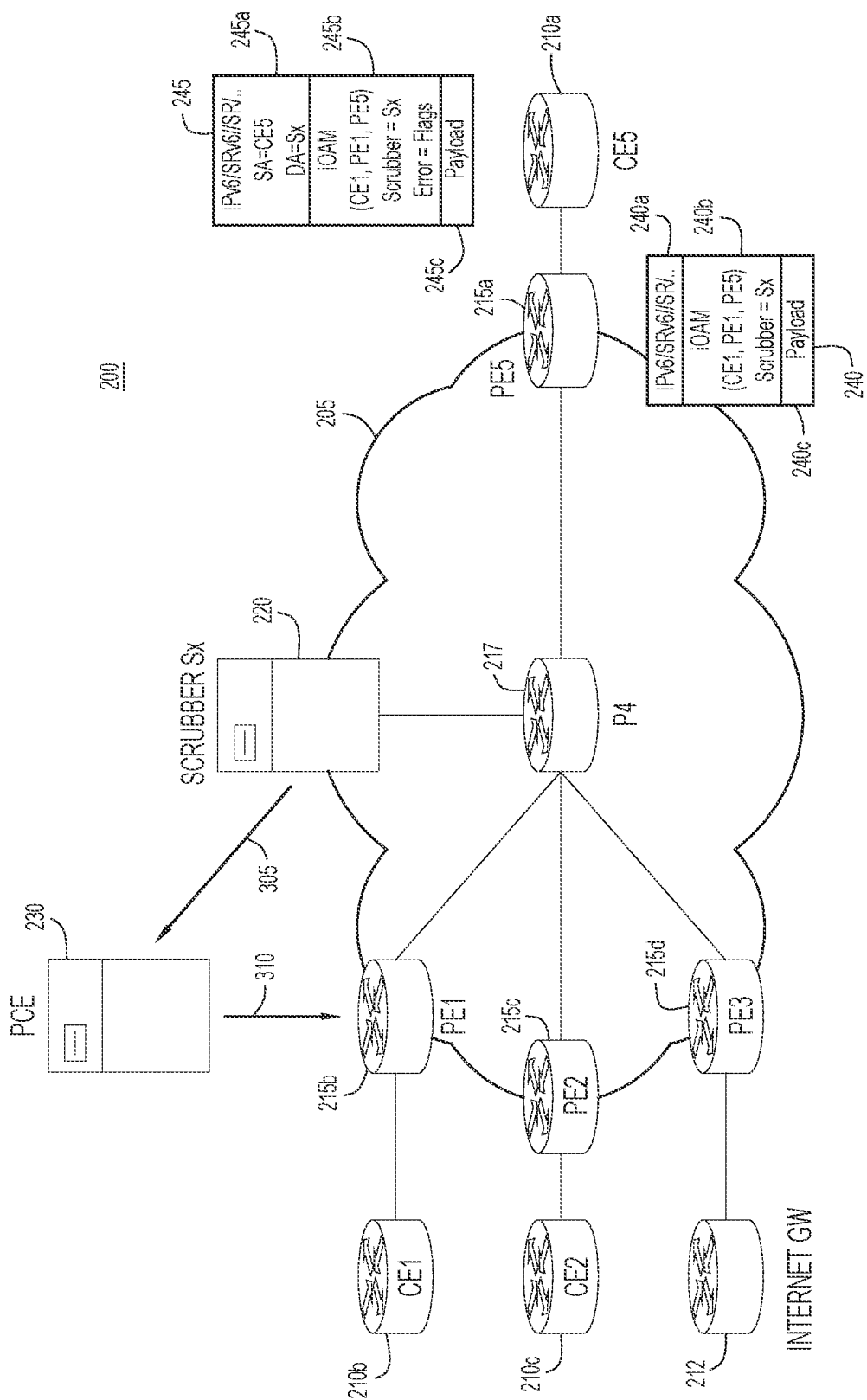
FIG. 3 is an illustration of the second network environment, and accompanying operations, configured to transmit packets suspected of being associated with a DDoS attack to a traffic scrubber and the creation of a multipoint conduit configured for DDoS remediation and prevention, according to an example embodiment.

With reference now made to FIG. 3, upon receipt of packet 245, traffic scrubber 220 remediates the traffic (drops the packet, redirects the packet, indicates a secondary path for the packet, etc.). Traffic scrubber 220 also provides to PCE 230 data indicative of the multipoint conduit through which the packet was received at traffic scrubber 220, as illustrated in operation 305. The data indicative of the multipoint conduit may be transmitted to PCE 230 via packets transmitted through network 205. According to other example embodiments, scrubber 200 may provide the data indicative of the multipoint conduit via an out-of-band signaling channel. Essentially, traffic scrubber 220 provides the contents of multipoint conduit header portion 245b of packet 245 to PCE 230. PCE 230 may obtain the data indicative of the multipoint conduit through normal PCE communication models such as PCEP communications, or packet 245 may be forwarded to PCE 230 in its entirety. Through receipt of this information, PCE 230 is made aware of the details of the suspected DDoS attack, including the path or conduit over which it was detected. Based upon this information, PCE 230 may identify the ingress provider edge network devices that may be associated with the DDoS attack, and may generate policies for remediation of the DDoS attack for inclusion at provider edge network devices. For example, as illustrated through the content of multipoint conduit header portion 245b, PCE 230 will be aware that the suspicious packet 245 was received at customer edge network device 210b and provider edge network device 215b. With this information, PCE 230 provides policies to the identified provider edge network devices, as illustrated in operation 310. The policies may be provided to the edge network devices through packets transmitted through network 205. According to other example embodiments, the policies may be provided to the edge network devices via an out-of-band signaling channel. Examples of such policies would indicate that traffic received at provider edge network device 215b from customer edge network device 210b destined for customer edge 210a should be rerouted to traffic scrubber 220. Additional constraints may be included in such policies. For example, only traffic that is received with one or more of an unknown source, an abnormal connection rate, a particular previous history, and/or other indications may be forwarded to traffic scrubber 220.

Figure 4:
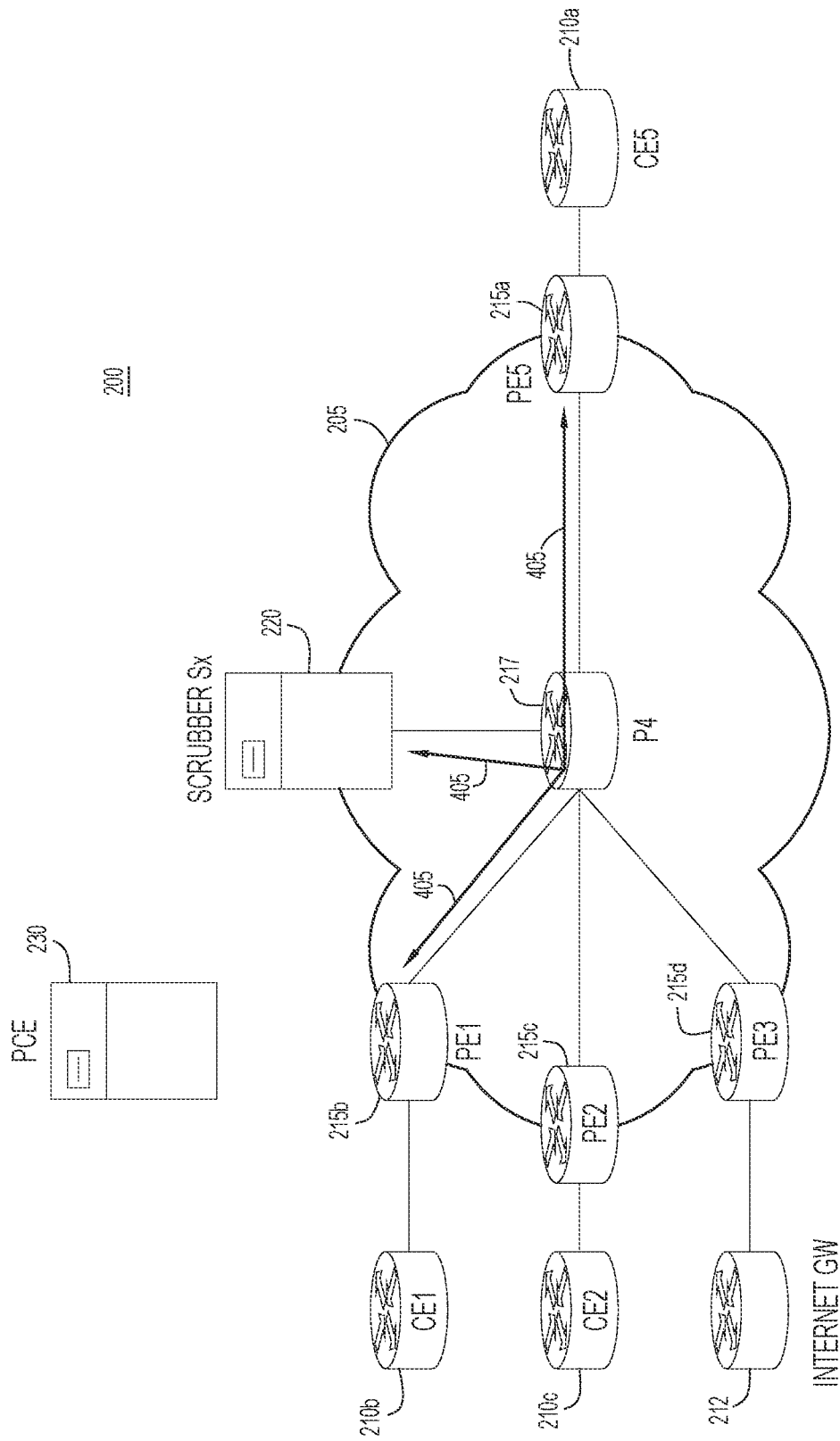
FIG. 4 is an illustration of the second network environment, including the multipoint conduit configured for DDoS remediation and prevention, according to an example embodiment.
Figure 5:
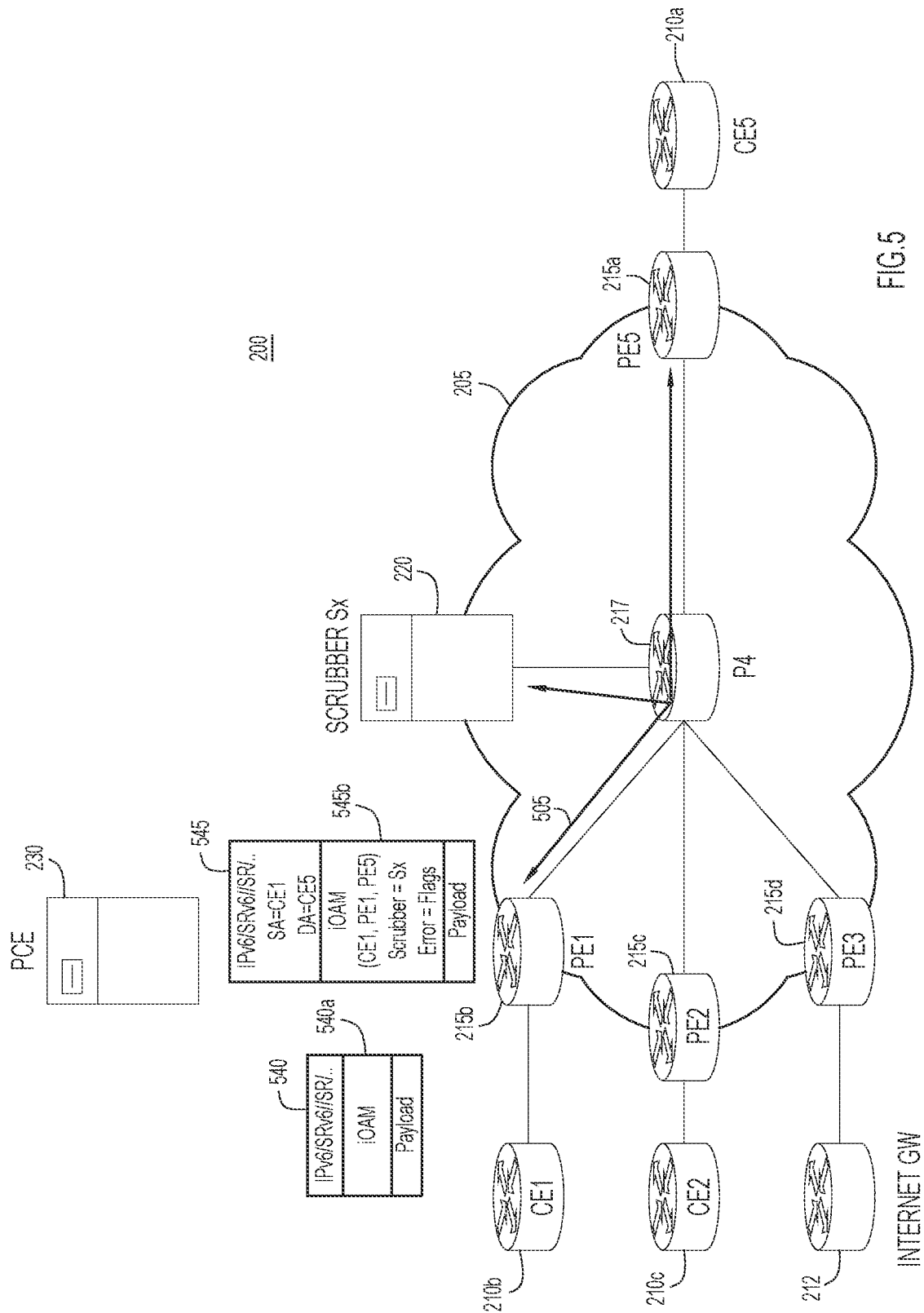
FIG. 5 is an illustration of the second network environment and operations implemented by the multipoint conduit configured for DDoS remediation and prevention, according to an example embodiment.

Accordingly, through the policies provided to (e.g., transmitted to) the edge network devices in operation 310, a multipoint conduit is established as illustrated in FIG. 4. With reference now made to FIG. 4, depicted therein is network environment 200 in which multipoint conduit 405 is illustrated. As shown, multipoint conduit 405 may route traffic to either of provider edge network device 215a or traffic scrubber 220 depending upon the content of the multipoint conduit header portion of a packet header. If there are no error flags indicated in the multipoint conduit header portion of the packet, the traffic will be routed from provider edge network device 215b to provider edge network device 215a. On the other hand, if a packet is received at intermediate network device 217 and error flags are included in the multipoint conduit header portion of the packet header, the packet may be forwarded to traffic scrubber 220. An example of such a traffic forwarding is illustrated in FIG. 5. If the remediation performed by traffic scrubber 220 determines that the traffic is not part of a DDoS attack, or the remediation removes any maliciousness from the packet, the traffic may continue on to provider edge network device 215a via multipoint conduit 405.

With reference now made to FIG. 5, depicted therein are operations performed by, for example, a provider edge network device subsequent to receiving DDoS remediation policies, as described above with reference to FIG. 3. Specifically, as illustrated in FIG. 5, packet 540 is received from customer edge network device 210b at provider edge network device 215b. As illustrated, the packet includes multipoint conduit header portion 440a that indicates that the packet is destined for customer edge network device 210a. Upon receipt of packet 540, the policies provided to provider edge network device 215b by PCE 230 in operation 310 of FIG. 3 are implemented. These policies may include modifying packet 540 such that it contains data as indicated in packet 545. First, the multipoint conduit information is included in multipoint conduit header portion 545b of packet 545. As illustrated, the multipoint conduit information indicates that the conduit includes customer edge network device 210b, provider edge network device 215b and provider edge network device 215a. If the policies implemented at provider edge network device 215b indicate that packet 540 meets the requirements for a suspicious DDoS packet, error flags are included in multipoint conduit header portion 545b, and the packet is routed through multipoint conduit 505.

Upon receipt at intermediate network device 217, it is determined to which endpoint of multipoint conduit 505 packet 545 should be forwarded. If no error flags were indicated in multipoint conduit header portion 545b, packet 545 would be routed to provider edge network device 215a. Yet, as illustrated in FIG. 5, multipoint conduit header portion 545b does include error flags. Accordingly, packet 545 is forwarded to traffic scrubber 220 for DDoS remediation.

Accordingly, provided for in the example embodiment illustrated in FIGS. 2-5 is a multipoint enterprise conduit between customer edge network devices and/or internet gateways over provider edge network devices that allow packets to carry limited path information along with scrubber details in the multipoint header. When any node detects/suspects DDoS packets, it will forward the traffic with the multipoint conduit information to a traffic scrubber that may be used to instantiate a DDoS redirect tunnel for traffic scrubbing. With this method, DDoS traffic may be rerouted to a scrubber as the traffic enters the network, even if the DDoS detecting system is further down the packet network path.

Figure 6:
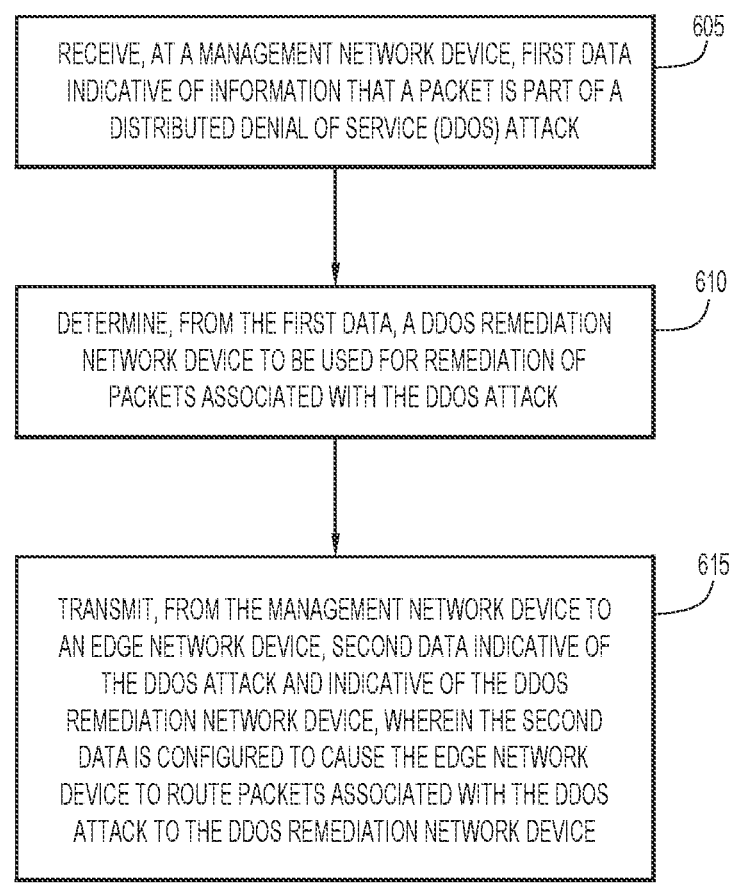
FIG. 6 is a flowchart illustrating a process flow for providing DDoS remediation and prevention, according to an example embodiment.

With reference now made to FIG. 6, depicted therein is a flowchart 600, illustrating a process flow for implementing the DDoS remediation techniques of the present application. The process flow begins in operation 605 in which first data indicative of information that a packet is part of a DDoS attack is obtained by or received at a management network device. Examples of operation 605 include the transmission of data to DDoS prevention controller 125 though operation 135, or transmission of data to PCE 130 in operation 140, both of FIG. 1. An additional example includes the transmission of data to PCE 230 through operation 305 of FIG. 3.

In operation 610, a DDoS remediation network device to be used for remediation of packets associated with the DDoS attack is determined. Examples of operation 610 may include the determination by PCE 130 of FIG. 1 that traffic scrubber 120a performs remediation for the DDoS suspected traffic as illustrated in FIG. 1. An additional example includes the determination by PCE 230 that the multipoint conduit that includes traffic scrubber 220 should be used to remediate traffic, as illustrated in FIG. 3.

Finally, in operation 615, second data indicative of the DDoS attack and indicative of the DDoS remediation network device is transmitted from the management network device to an edge network device. In other words, the management network device provides the second data to an edge network device. The second data is configured to cause the edge network device to route packets associated with the DDoS attack to the DDoS remediation network device. Examples of operation 615 include the transmission of the SID from PCE 130 to provider edge network devices 115b and 115c in operations 145a and 145b, respectively, as illustrated in FIG. 1. An additional example includes the transmission of policies from PCE 230 to provider edge network device 215b in operation 310, as illustrated in FIG. 3.

Figure 7:
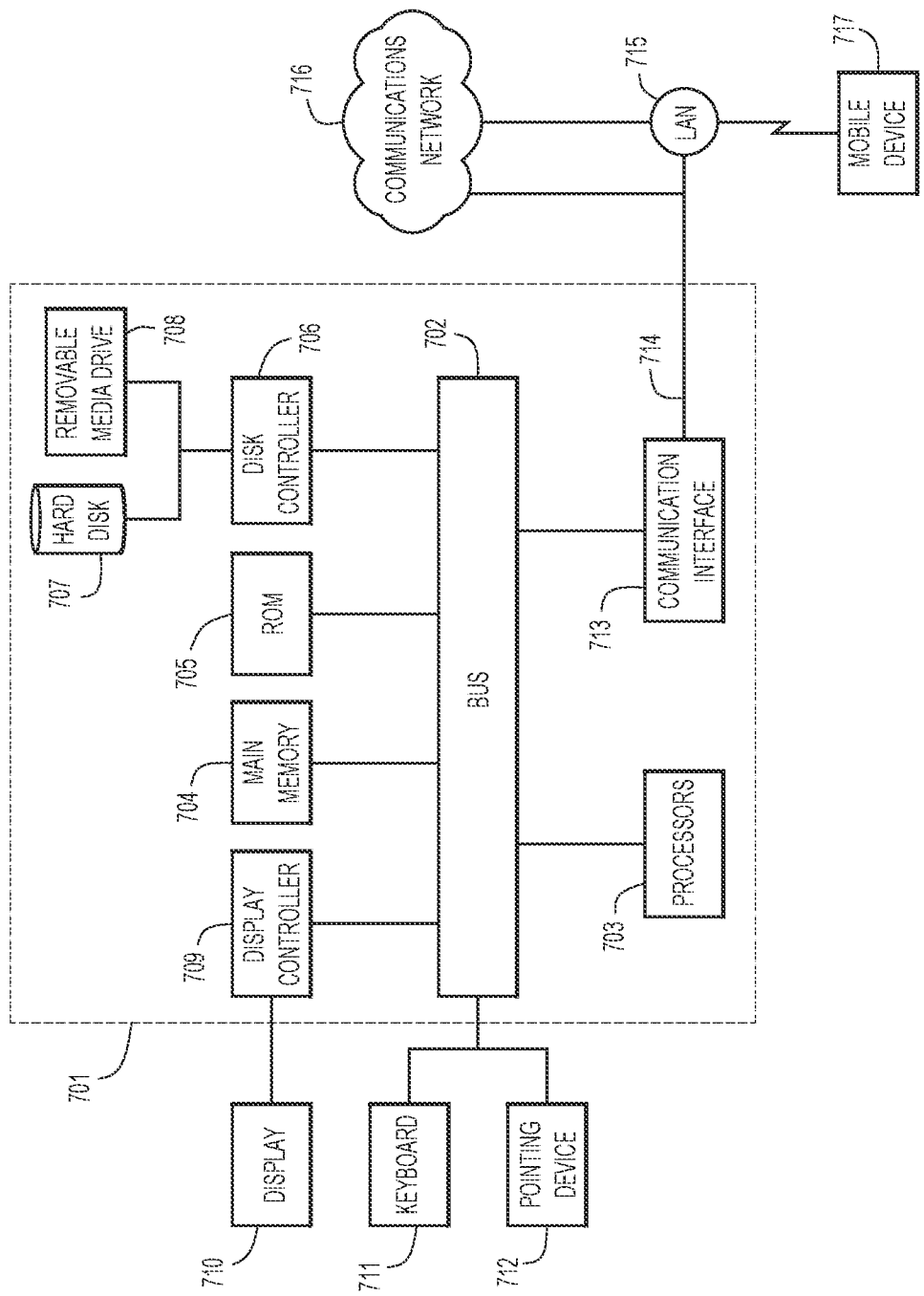
FIG. 7 is a block diagram of an apparatus configured to perform the techniques described herein, according to an example embodiment.

With reference now made to FIG. 7, depicted therein is a computer system 701 upon which the embodiments presented may be implemented. The computer system 701 may be programmed to implement a computer based device, such as the routers, mapping systems, and other network devices described above with reference to FIGS. 1-8. The computer system 701 includes a bus 702 or other communication mechanism for communicating information, and a processor 703 coupled with the bus 702 for processing the information. While the figure shows a single block 703 for a processor, it should be understood that the processors 703 represent a plurality of processing cores, each of which can perform separate processing. The computer system 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703.

The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, Liquid Crystal Display (LCD) or other now known or hereinafter developed display technologies, for displaying information to a computer user. The computer system 701 includes input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. In addition, a printer may provide printed listings of data stored and/or generated by the computer system 701.

The computer system 701 performs a portion or all of the processing steps of the process in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the process, and for enabling the computer system 701 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local area network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA) laptop computer, or cellular telephone.

In summary, provided here is a method comprising: receiving, at a management network device, first data indicative of information that a packet is part of a Distributed Denial of Service (DDoS) attack; determining, from the first data, a DDoS remediation network device to be used for remediation of packets associated with the DDoS attack; transmitting, from the management network device to an edge network device, second data indicative of the DDoS attack and indicative of the DDoS remediation network device, wherein the second data is configured to cause the edge network device to route packets associated with the DDoS attack to the DDoS remediation network device.

Also provided is an apparatus comprising a network interface configured to communicate over networks, and one or more processors. The one or more processors are configured to: receive, via the network interface, first data indicative of information that a packet is part of a Distributed Denial of Service (DDoS) attack; determine, from the first data, a DDoS remediation network device to be used for remediation of packets associated with the DDoS attack; transmit, via the network interface to an edge network device, second data indicative of the DDoS attack and indicative of the DDoS remediation network device, wherein the second data is configured to cause the edge network device to route packets associated with the DDoS attack to the DDoS remediation network device.

In addition, in another form, one or more non-transitory computer readable media are provided. The media are encoded with instructions that, when executed by one or more processors, are operable to: receive, at a management network device, first data indicative of information that a packet is part of a Distributed Denial of Service (DDoS) attack; determine, from the first data, a DDoS remediation network device to be used for remediation of packets associated with the DDoS attack; transmit, from the management network device to an edge network device, second data indicative of the DDoS attack and indicative of the DDoS remediation network device, wherein the second data is configured to cause the edge network device to route packets associated with the DDoS attack to the DDoS remediation network device.

Example embodiments of the above-described method, apparatus and computer readable media provide for multipoint enterprise conduits between customer edge devices and/or Internet gateways over provider edge devices that allow packets to carry limited path information along with scrubber details in the multipoint enterprise conduit header. When network nodes (e.g., egress provider edge devices, egress customer edge devices, and others) detects or suspects DDoS attack, the node may forward the traffic with multipoint enterprise conduit information a DDoS remediation devices, such as a scrubber. This information may be used to instantiate a DDoS redirect tunnel for traffic scrubbing. According to such example embodiments, DDoS traffic may be rerouted to a scrubber as the traffic enters the network, even if the DDoS detecting system is further down the packet network path.

Example embodiments of the above-described methods, apparatus and computer readable media may also provide for novel DDoS detection systems that extend the DDoS information to a PCE. The PCE may then use a novel network function Segment ID called the DDoS SID, imposed on the edge routers by the PCE. The DDoS SID may be used to identify potentially suspicious DDoS traffic. The DDoS SID may be used in Segment Routing routers to direct suspicious traffic to nearby or specially optimized DDoS scrubber so that traffic may be cleaned. Other traffic flows proceed unchanged through the network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
receiving, at a Segment Routing Path Computation Element, first data indicative of information that a packet is part of a Distributed Denial of Service (DDoS) attack of a network for which the Segment Routing Path Computation Element provides management services;
determining, from the first data, a DDoS remediation network device to be used for remediation of packets associated with the DDoS attack; and
transmitting, from the Segment Routing Path Computation Element to an edge network device, second data indicative of the DDoS attack and a Segment Identifier (SID) to be incorporated into a header of the packets associated with the DDoS attack and indicative of a path to the DDoS remediation network device, wherein the second data is configured to cause the edge network device to split traffic such that first packets of a first traffic flow, destined for the network to which the Segment Routing Path Computation Element provides management services and associated with the DDoS attack, are routed to the DDoS remediation network device via the SID, and second packets of a second traffic flow, destined for the network to which the Segment Routing Path Computation Element provides management services and not associated with the DDoS attack, are not routed to the DDoS remediation network device.

2. The method of claim 1, wherein the DDoS remediation network device comprises a network service function configured to remediate DDoS attacks.

3. The method of claim 1, wherein receiving the first data comprises receiving the first data from a second edge network device.

4. The method of claim 1, wherein transmitting the second data comprises transmitting data configured to cause the edge network device to redirected traffic to the DDoS remediation network device via a multipoint enterprise conduit.

5. The method of claim 4, wherein receiving the first data comprises receiving the first data from the DDoS remediation network device.

6. The method of claim 1, wherein transmitting the second data comprises transmitting in-situ operations, administration and management data configured to redirected traffic to the DDoS remediation network device via a multipoint enterprise conduit.

7. The method of claim 6, wherein receiving the first data comprises receiving the first data from the DDoS remediation network device.

8. The method of claim 1, wherein transmitting the second data comprises transmitting the second data to an ingress edge network device for the network to which the Segment Routing Path Computation Element provides management services.

9. The method of claim 1, wherein receiving the first data comprises receiving the first data from a DDoS Prevention Controller.

10. An apparatus comprising:
a network interface configured to enable network communications; and
one or more processors, wherein the one or more processors are configured to perform operations on behalf of a Segment Routing Path Computation Element, the operations comprising:
receiving, via the network interface, first data indicative of information that a packet is part of a Distributed Denial of Service (DDoS) attack of a network for which the Segment Routing Path Computation Element provides management services;
determining, from the first data, a DDoS remediation network device to be used for remediation of packets associated with the DDoS attack; and
transmitting, via the network interface to an edge network device, second data indicative of the DDoS attack and a Segment Identifier (SID) to be incorporated into a header of the packets associated with the DDoS attack and indicative of a path to the DDoS remediation network device, wherein the second data is configured to cause the edge network device to split traffic such that first packets of a first traffic flow, destined for the network to which the Segment Routing Path Computation Element provides management services and associated with the DDoS attack, are routed to the DDoS remediation network device via the SID, and second packets of a second traffic flow, destined for the network to which the Segment Routing Path Computation Element provides management services and not associated with the DDoS attack, are not routed to the DDoS remediation network device.

11. The apparatus of claim 10, wherein the DDoS remediation network device comprises a network service function configured to remediate DDoS attacks.

12. The apparatus of claim 10, wherein the one or more processors are configured to transmit the second data by transmitting data configured to cause the edge network device to redirected traffic to the DDoS remediation network device via a multipoint enterprise conduit.

13. The apparatus of claim 12, wherein the one or more processors are configured to receive the first data by receiving the first data from the DDoS remediation network device.

14. One or more non-transitory computer readable media encoded with instructions, wherein the instructions, when executed by one or more processors, are operable to:
receive, at a Segment Routing Path Computation Element, first data indicative of information that a packet is part of a Distributed Denial of Service (DDoS) attack of a network for which the Segment Routing Path Computation Element provides management services;
determine, from the first data, a DDoS remediation network device to be used for remediation of packets associated with the DDoS attack; and
transmit, from the Segment Routing Path Computation Element to an edge network device, second data indicative of the DDoS attack and a Segment Identifier (SID) to be incorporated into a header of the packets associated with the DDoS attack and indicative of a path to the DDoS remediation network device, wherein the second data is configured to cause the edge network device to split traffic such that first packets of a first traffic flow, destined for the network to which the Segment Routing Path Computation Element provides management services and associated with the DDoS attack, are routed to the DDoS remediation network device via the SID, and second packets of a second traffic flow, destined for the network to which the Segment Routing Path Computation Element provides management services and not associated with the DDoS attack, are not routed to the DDoS remediation network device.

15. The one or more non-transitory computer readable media of claim 14, wherein the instructions are further operable to transmit the second data by transmitting data configured to cause the edge network device to redirected traffic to the DDoS remediation network device via a multipoint enterprise conduit.

16. The one or more non-transitory computer readable media of claim 15, wherein the instructions are further operable to receive the first data by receiving the first data from the DDoS remediation network device.

17. The one or more non-transitory computer readable media of claim 14, wherein the DDoS remediation network device comprises a network service function configured to remediate DDoS attacks.

18. The one or more non-transitory computer readable media of claim 14, wherein the first data is received from a second edge network device.

19. The apparatus of claim 10, wherein the first data is received from a second edge network device.

20. The apparatus of claim 10, wherein the first data is received from a DDoS Prevention Controller.

* * * * *